H. O. RUGH.
SIGNALING SYSTEM.
APPLICATION FILED JULY 8, 1909.
1,018,375.
Patented Feb. 20, 1912.
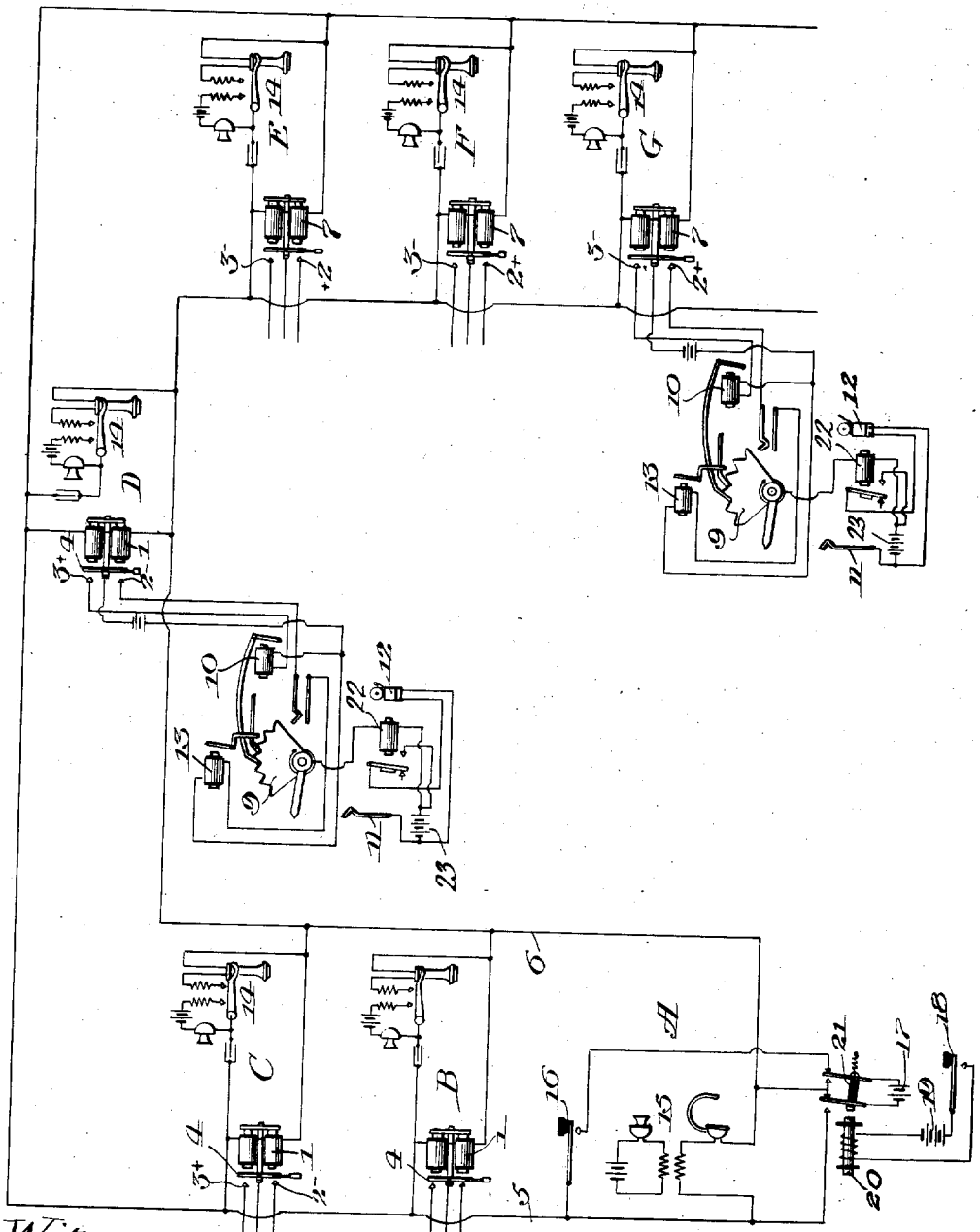
Witnesses
O. M. Nemiel
J. Elliott
Inventor
Harry O. Rugh
by Max W. Zabel
Atty

UNITED STATES PATENT OFFICE.

HARRY O. RUGH, OF SANDWICH, ILLINOIS, ASSIGNOR TO SANDWICH ELECTRIC COMPANY, OF SANDWICH, ILLINOIS, A CORPORATION OF ILLINOIS.

SIGNALING SYSTEM.

1,018,375.  Specification of Letters Patent. Patented Feb. 20, 1912.

Application filed July 8, 1909. Serial No. 506,584.

*To all whom it may concern:*

Be it known that I, HARRY O. RUGH, citizen of the United States, residing at Sandwich, in the county of Dekalb and State of Illinois, have invented a certain new and useful Improvement in Signaling Systems, of which the following is a full, clear, concise, and exact description, reference being had to the accompanying drawings, forming a part of this specification.

My invention relates to selector systems, and has for its object the provision of means to increase the number of stations that can properly be called with a given set of instrumentalities.

I will describe my invention more in detail by reference to the accompanying drawing illustrating the preferred embodiment thereof, in which I have shown a central station A, and substations B, C and D, and likewise substations E, F and G. Each substation is provided with a polarized relay 1, which is provided with two contact points 2 and 3; in the stations B, C and D, contact point 2 being engaged by the armature 4 when negative battery current is sent over the line wires 5 and 6, and contact 3 being engaged when positive battery current is sent out. Stations E, F and G also have relays of similar design, which I have numbered 7, which relays also have contact points 2 and 3, but the connection is such, as diagrammatically shown by the reversal of their connection to the line wires 5 and 6, that contact point 2 of substations E, F and G is connected with the armature, when positive current is passed over the line wires, and contact 3 is engaged when negative current passes over said line wires.

Each relay 1 controls a step-up selector 9, which step-up selector is stepped up by a magnet 10 which is governed by the contact point 3, whereupon the step-up selector makes connection with its spring 11, to operate the local signal 12. A release magnet 13, under the control of the contact 2, restores the step-up mechanism to normal. Now, in the stations E, F and G, whenever positive impulses are sent out (which positive impulses step-up the selectors 9 at the stations B, C and D), these positive impulses operate the magnets 13 in said stations E, F and G, which are the release magnets, and therefore, no stepping up of selectors 9 at stations E, F and G is made. When, however, negative battery current is sent over the line wires 6, the release magnets 13 of the stations B, C and D, operate thereby to step up the selectors at those stations, but these same negative impulses step up the selectors 9 at stations E, F and G, thus calling their predetermined allotted stations. In general, therefore, I have a system which permits of doubling the capacity of the selectors. Take, for instance, the selector 9, which is capable of calling three stations, as herein stated. In practice, the number called is usually about thirty. Then, we place these selectors at stations B, C and D, so arranged that positive current will step them up, and place three more selectors at stations E, F and G, capable of being stepped up by negative current. The current opposite to that required for operation in each instance only actuates the release magnet, thus causing no actuation of the step-up devices. I accomplish this by reversing the connections of the relays 7 to the line circuit, as distinguished from the connections of the relays 1 to the line circuit, as stated.

Each substation, of course, has its allotted telephone appliances 14, the train despatcher at station A, also having his telephone appliances 15. A key 16, in association with a battery 17, sends positive impulses, as desired, over the lines, and when it is desired to send negative impulses, to call either of the stations E, F or G, then the key 18 is depressed until, by means of battery 19, relay 20 and pole changing springs 21 serve to reverse the polarity of battery 17, on the line wires 5 and 6. A relay 22 is under the control of the contact arm of the step-by-step element and the spring 11, and controls the connection of a battery 23 with the signal 12. Whenever a contact arm of the element 9 closes circuit with the spring 11 a circuit is established through the said relay 22 and battery 23 so that its slow acting armature closes the circuit through the signal 12 and the battery 23. When the circuit between the contact arm of the element 9 and the spring 11 is broken, the relay 22 releases its armature and the signal 12 ceases its operations. The relay 22 is slow acting so that the passing contact which is established whenever the contact arm of the element 9 momentarily engages the spring 11 as when a station beyond the one under consideration is being called the said relay 22 will not respond, but will only respond should the said contact arm be held in engagement with the spring 11 at that particular station which it is desired to call.

In the general operation of the system impulses are transmitted from the battery 17 by means of the key 16 which are of the proper polarity to operate the relays 1 to close circuit with their contacts 3. The step-by-step elements 9 under the control of the magnets 10 are thereby stepped around in accordance with the number of impulses to such a position that contact is established between the arm of the element 9 and the spring 11 of that particular station which it is desired to call, at which time the key 16 is held closed to permit the corresponding relay 22 to attract its armature, thereby to operate the signal 12. After the signal has been operated a sufficient length of time key 18 is depressed which sends a current of a reverse polarity so that the armatures 4 are associated with the contacts 2, thereby to operate the magnets 13 to release the step-by-step elements 9 of the said stations B, C and D. Now whenever it is desired to call any of the stations E, F and G, the key 18 is used so that impulses of the reverse polarity to those which operate the magnets 10 at the stations B, C and D are sent over the line wires, and these impulses of reverse polarity operate the group of selectors at the stations E, F and G as these impulses of a reverse polarity cause closure of the contacts 3 of the relays 7 to thereby include the step-up magnets 10 of those stations in circuit to operate their corresponding step-by-step elements 9. It will thus be seen that impulses of one polarity operatively actuate the step-by-step elements in the first group of stations, and impulses of the opposite polarity operatively actuate the selectors at the second group of stations. In this way the number of impulses required is reduced so that in calling any one of the six stations the maximum number of impulses required would be three.

While I have herein shown and particularly described the preferred embodiment of my invention, I do not desire to limit myself to the precise construction and arrangement as herein shown, but

Having thus described my invention, what I claim as new and desire to secure by Letters Patent is:

1. A signaling system comprising a circuit for uniting two groups of substations with a central station, a step-by-step selector at each substation, electro-magnetic step-up means for operating each selector associated with said circuit, means controlled at the central station for operatively actuating a group of said step-up means simultaneously, and means controlled at the central station for operatively actuating the remainder of said step-up means.

2. A signaling system comprising a circuit for uniting a plurality of substations with a central station, a step-by-step selector at each substation, a magnet for each selector associated with the common circuit, and means controlled at the central station for operatively actuating said magnets in groups to thereby operate any predetermined group of selectors.

3. A signaling system comprising a circuit for uniting two groups of substations with a central station, a step-by-step selector for each substation of each group, a magnet for each selector of the first group adapted to control the step-up operation operable with a given character of current, a magnet for each selector of the second group adapted to control the step-up operation operable with a different character of current, and means controlled at the central station for causing the operation of said magnets.

4. A signaling system comprising a circuit for uniting two groups of substations with a central station, a step-by-step selector for each substation of each group, a magnet for each selector of the first group adapted to control the step-up operation operable with a given polarity of current, a magnet for each selector of the second group adapted to control the step-up operation operable with a different polarity of current, and means controlled at the central station for causing the operation of said magnets.

5. A signaling system comprising a circuit for uniting two groups of substations with a central station, a step-by-step selector for each substation of each group, a magnet for each selector of the first group adapted to control the step-up operation operable with a given polarity of current, a magnet for each selector of the second group adapted to control the step-up operation operable with a different polarity of current, release means for each selector to restore same, and means controlled at the central station for causing the operation of said magnets.

6. A signaling system comprising a line circuit for uniting two groups of substations with a central station, a step-by-step selector for each substation of each group, a magnet for each selector of the first group adapted for step-up operation with a given polarity of current, a magnet for each selector of the second group adapted for step-up operation with a different polarity of current, a second magnet for each selector to restore same and adapted for operation by current of a polarity opposite to that of its associated step-up magnet, and means at the central station for causing the selective operation of said magnets.

7. A signaling system comprising a circuit for uniting a plurality of substations with a central station, a selective impulse mechanism at each substation, electro-magnetic means for each selective impulse mechanism associated with the common circuit, and means controlled at the central station for operating said electro-magnetic means in groups to thereby operatively actuate any predetermined group of impulse mechanisms.

In witness whereof, I hereunto subscribe my name this 19th day of May A. D., 1909.

HARRY O. RUGH.

Witnesses:
J. ELLIOTT,
MAX W. ZABEL.

Copies of this patent may be obtained for five cents each, by addressing the "Commissioner of Patents, Washington, D. C."